W. S. THOMPSON.
SHOCK ABSORBER.
APPLICATION FILED JULY 6, 1915.

1,192,358.

Patented July 25, 1916
2 SHEETS—SHEET 1.

Witnesses

Inventor
William S. Thompson,
By
Attorneys

Inventor
William S. Thompson,

UNITED STATES PATENT OFFICE.

WILLIAM S. THOMPSON, OF TOLEDO, OHIO.

SHOCK-ABSORBER.

1,192,358.

Specification of Letters Patent.

Patented July 25, 1916.

Application filed July 6, 1915. Serial No. 38,055.

*To all whom it may concern:*

Be it known that I, WILLIAM S. THOMPSON, a citizen of the United States, residing at Toledo, in the county of Lucas and State of Ohio, have invented certain new and useful Improvements in Shock-Absorbers, of which the following is a specification, reference being had therein to the accompanying drawing.

This invention relates to shock absorbers and more particularly to that type of shock absorbers in which a supplemental spring is interposed between the two parts of the main vehicle spring. It has been proposed heretofore to interpose supplemental springs between the main springs of the vehicle and to arrange these springs between the ends of an elliptical spring. These devices have, however, for the most part been open to various objections. They are more or less expensive to manufacture which makes them costly to the consumer; they, for the most part, at least, comprise sliding parts which produce friction and reduce the efficiency of the supplemental spring; and they lack adjustability to accommodate the supplemental spring to different conditions.

An object of the present invention is to overcome these objections and provide a shock absorbing device of this character which can be produced at a low cost; to so construct this device as to eliminate all sliding parts and to a large extent to eliminate friction; and further, to so construct the device that the tension of the spring may be easily adjusted.

A further object of the invention is to obtain easy riding by means of the non-synchronous action of springs.

Figure 1:
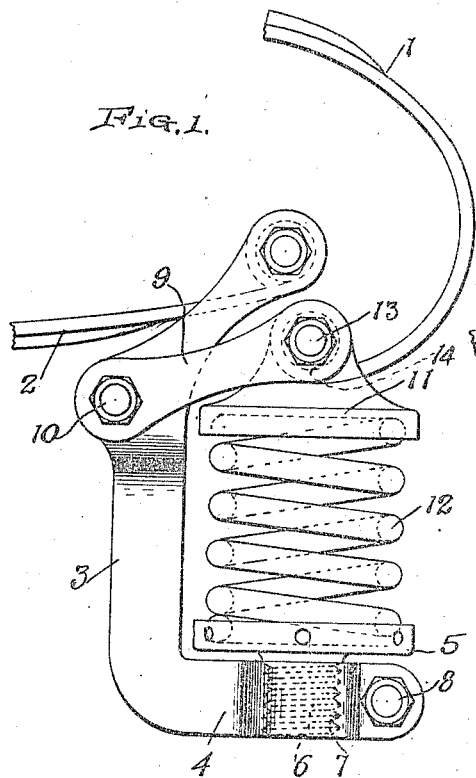
Figure 2:
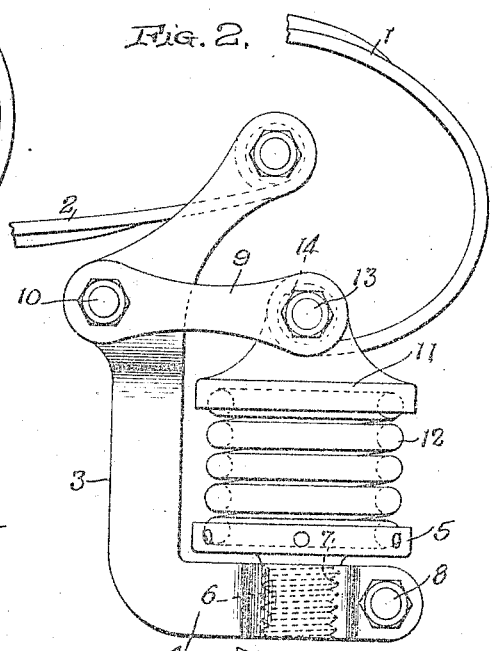
Figure 3:
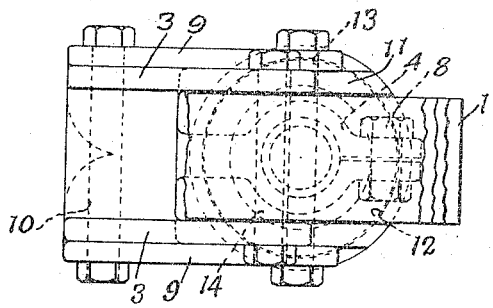
Figure 4:
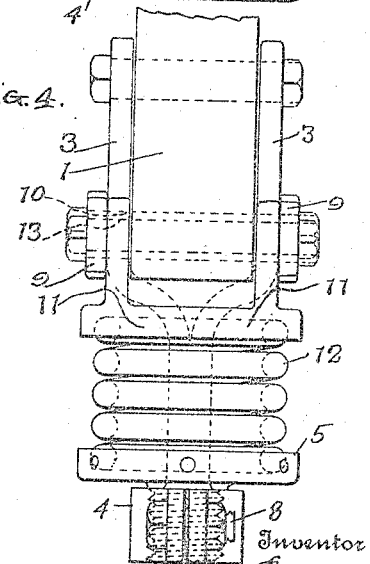
Figure 5:
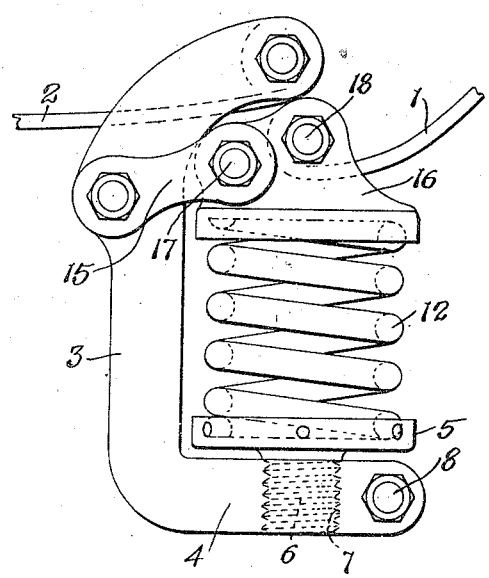
Figure 6:
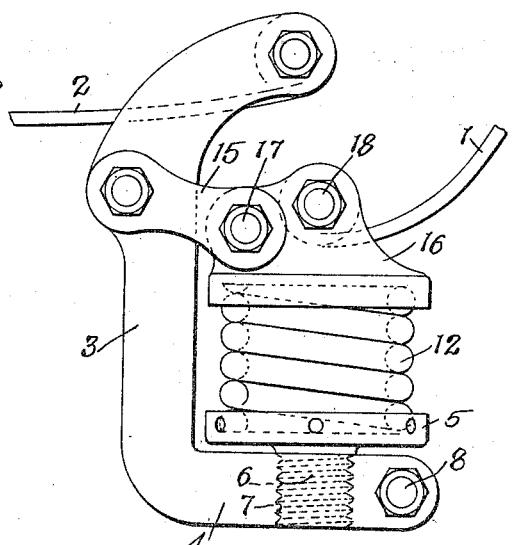
Figure 7:
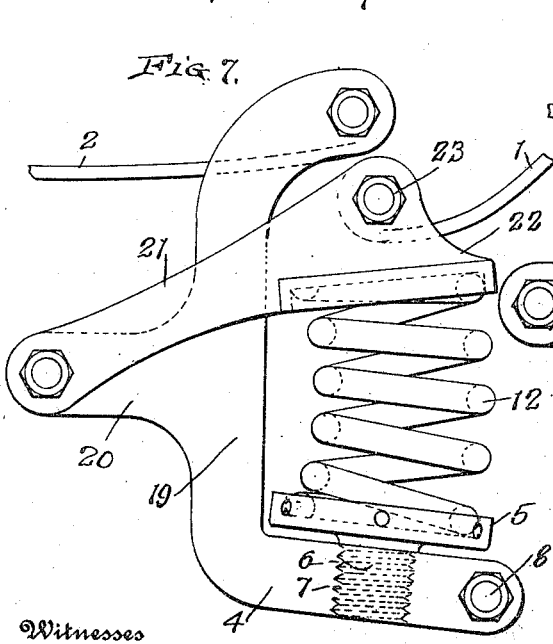
Figure 8:
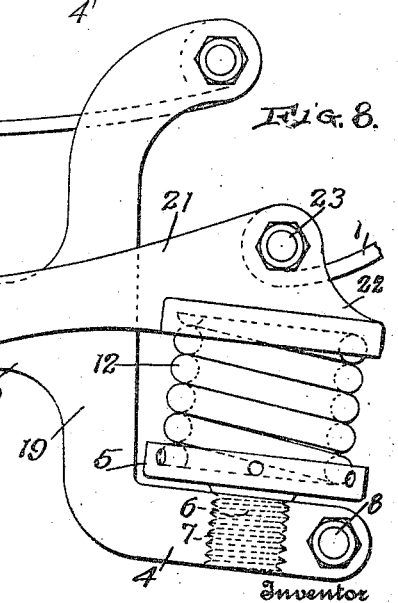

In the accompanying drawings, Figure 1 is a side elevation of a device embodying my invention showing the spring in its extended position; Fig. 2 is a similar view showing the spring compressed; Fig. 3 is a top, plan view of such a device; Fig. 4 is an end elevation of the same; Fig. 5 is a side elevation of a modified form of the device showing the spring extended; Fig. 6 is a similar view showing the spring compressed; Fig. 7 is a side elevation of a further modification of the invention, showing the spring extended; and Fig. 8 is a similar view showing the spring compressed.

In these drawings I have illustrated several embodiments of my invention but these embodiments differ one from the other in structural respects only and each embodies the essential novel features of the invention. In each instance I have shown the shock absorbing device, or supplemental spring, as applied to a type of elliptical spring comprising an upper portion or leaf 1 having its end curved about and adapted to be connected with the lower portion or leaf 2. To the end of the lower portion 2 of the spring I have pivotally connected a one piece or integral hanger 3, which is preferably formed by stamping so that it can be very cheaply made, and I have provided this hanger at its lower end with a substantially horizontal portion 4 having a part forming a seat for a spring. In this form of the device this seat forming part is separate from the hanger and comprises a flange plate 5 having a screw-threaded stud 6 adapted to be inserted in a screw-threaded socket 7 formed in the horizontal portion 4 of the hanger. Preferably, the end of the hanger is slotted, as shown in Fig. 3, and a bolt 8 is passed through this slotted end of the hanger to enable the socket to be clamped tightly about the stud 6 to lock the same in its adjusted position. I am thus enabled to vary the position of the plate 5, and the seat for the spring, with relation to the hanger to vary the tension of the spring, as will hereinafter appear.

In order that the axis of the spring may be substantially in line with the axis of the connection between the hanger and the vehicle spring and the seat for the sup-hanger extends outwardly so that the hanger as a whole is approximately C-shaped. Pivotally connected to the hanger between its point of connection with the vehicle spring and the seat for the supplemental spring is a radius link 9 which, in the present instance, comprises two arms mounted on the respective ends of a bolt 10 extending through the rear portion of the hanger, it being noted that this one piece hanger is bifurcated at its upper end. This radius link is provided at its free end with a part, such as a cap 11, forming a seat for a spring, and I have mounted between the cap 11 and the plate 5 a helical spring 12 which constitutes the supplemental spring of the shock absorbing device.

As shown in Figs. 1 to 6 the seat-forming part 11 is formed separately from the radius link 9 and is pivotally connected thereto by means of a bolt 13. The part 11 is also pivotally connected with the end of the upper part or leaf 1 of the vehicle spring and in the arrangement here shown this pivotal connection is accomplished by passing the bolt 13, by means of which the part 11 is connected with the radius link, through a socket or opening in the end of the part 1 of the vehicle spring, as shown at 14. With this arrangement of the device the supplemental spring is interposed between the two parts of the main spring in such a manner that there is practically no frictional resistance to its operation, thus enabling the device to have the benefit of the full resiliency of the spring, and further, the tension of the spring can be regulated to adapt the same to different conditions by adjusting the plate 5, as described. It will be noted that the construction of the device is such that it can be applied to springs of this general type regardless of the relative locations of the ends of the two parts of the spring and will operate in a satisfactory manner. As is well known, springs of this type usually have their ends connected by a link and the position of this link and, consequently, the positions of the ends of the two parts of the spring, when the latter is in its normal position, differ with different manufacturers. The upper end of the hanger being bifurcated permits of the lower part of the spring extending between the two arms of the hanger beneath the bolt by means of which it is secured to the hanger, and allows the hanger a very considerable range of movement about its axis. The link likewise being pivoted to the hanger at a point below the axis of the hanger can be connected with the upper part of the spring regardless of the position of the end of that part of the spring, the pivotal movement of the hanger and link enabling them to be properly adjusted for this connection. Further, the link holds the seat for the supplemental spring in such a position that the thrust on the supplemental spring will be in substantial alinement with the axis of the spring regardless of the position which the device as a whole may assume due to the relative positions of the ends of the two parts of the spring.

In Figs. 5 and 6 I have shown a device substantially similar to that shown in Figs. 1 to 4 but have connected the upper seat for the supplemental spring 12 with the radius link and the upper portion of the vehicle spring on separate centers. To this end the radius link, which is shown at 15, is somewhat shorter than that shown in Figs. 1 to 4 and is pivotally connected to a seat-forming part 16 near one side thereof by means of a bolt 17 similar to the bolt 13 in the other form of the device. The upper portion 1 of the spring is connected to the part 16 by a bolt 18 arranged in substantially the same position as the bolt 13 of Figs. 1 to 4.

In Figs. 7 and 8 I have illustrated a still further modification of the invention. The hanger, which is here shown at 19, differs slightly from the hanger 3 of the other forms of the device in that it has a rearwardly extending arm 20 to which is pivoted a radius link 21, which is somewhat longer than the radius link of that form of the device shown in Figs. 1 to 3. Rigidly secured to, and in the present instance forming a part of, the radius link 21 is a seat forming part or cap 22 which receives the upper end of the supplemental spring 12, which is seated in the lower seat or plate 5 in the same manner as is shown in the other figures. The upper portion 1 of the vehicle spring is pivotally connected to the outer end of the radius link 21 at a point above and arranged substantially centrally of the seat forming part 22 by means of a bolt 23. This form of the device has certain advantages over the other forms, such as the low cost of production, the shortening of the bolt 23 and the elimination of one bearing.

The operation of the device will be readily understood from the foregoing description and it will be apparent that all forms of the device are very simple in their construction and are of such a character that they can, for the most part, at least, be formed by stamping, thus enabling the device to be produced very economically. Further, there are no sliding surfaces and, consequently, the only friction is that present in the pivotal connections which require but little lubrication and are subject to but little wear. Further, it will be apparent that in each form of the device the tension of the spring can be adjusted.

While I have shown and described certain embodiments of the invention it will be understood that these have been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

In a device of the character described, a hanger adapted to be connected with one part of a vehicle spring and having at its lower end a portion provided with a screw-threaded socket, a plate having a stud screw-threaded into said socket, said portion of said hanger having a slot opening into said socket; a bolt extending through said slot to clamp the socket about said stud, a link pivotally mounted on said hanger, and adapted for connection with the other part of said vehicle spring, a plate carried by said link and arranged above the first-mentioned plate, and a spring interposed between said plates.

In testimony whereof, I affix my signature.

WILLIAM S. THOMPSON.